United States Patent Office 3,291,789
Patented Dec. 13, 1966

3,291,789
DECAUSTICIZATION OF POLYSACCHARIDE XANTHATES
Douglas J. Bridgeford, Danville, Ill., assignor to Tee-Pak, Inc., Chicago, Ill., a corporation of Illinois
No Drawing. Filed June 7, 1962, Ser. No. 200,621
16 Claims. (Cl. 260—217)

This invention relates to new and useful improvements in processes for decausticizing alkali xanthates of film-forming polysaccharides and to the novel products of these processes.

Viscose has been known as an intermediate in the preparation of cellulose compositions for about seventy years. Cellulose xanthate was discovered by Cross and Bevan in 1892. It results from the interaction of carbon disulfide and alkali cellulose. A dilute aqueous alkaline solution of cellulose xanthate is known as viscose and consists of a mixture of sodium cellulose xanthates of varying molecular size, loosely combined with sodium hydroxide and dispersed in the solution together with alkalization and xanthation by-products. In commercial practice the viscose is allowed to age until it reaches the desired ripeness and then is extruded through a die into an acid medium to regenerate cellulose having the configuration of the die through which the viscose was extruded. Thus, it is possible to extrude viscose through a fine hole to produce a filament, through a slit to produce a film, or through an annulus to produce a tube. Viscose has also been used for impregnating paper or fabric for regenerating cellulose therein by subsequent treatment with acid. Attempts have also been made to regenerate viscose thermally to avoid the necessity for the acid resistant equipment with acid regeneration. The acid regeneration of viscose and the thermal regeneration of viscose both result in the formation of salts and other undesirable by-products which necessitate extensive washing and purification of the regenerated cellulose. Polysaccharides, e.g., starch, amylose, dextran, sugars, etc., are known to form alkali derivatives from which the corresponding xanthates can be prepared by reaction with carbon disulfide. The purification of these materials and regeneration of polysaccharides therefrom present problems which are similar to the purification and regeneration of cellulose from viscose.

It is, therefore, one object of this invention to provide a new and improved process for decausticizing an aqueous alkaline solution of an alkali xanthate of a film-forming polysaccharide.

Another object is to provide a novel composition comprising a decausticized aqueous solution of a film-forming polysaccharide xanthate.

Still another object of this invention is to provide novel products derived from decausticized solutions of film-forming polysaccharide xanthates.

A feature of this invention is the provision of a new and improved process for decausticizing an aqueous alkaline solution of a film-forming polysaccharide xanthate by dialysis, ion exchange, and/or ion retardation.

Another feature of this invention is the provision of a process wherein viscose, aqueous amylose xanthate, or analogous polysaccharide xanthate solutions are decausticized by subjection to dialysis, ion exchange, and/or ion retardation to produce a material having a pH less than about 13 and substantially free of regenerated polysaccharide material.

Still another feature of this invention is the provision of a process for decausticizing viscose or analogous polysaccharide xanthate solutions by treatment with a cation exchange resin in the hydrogen ion form.

Still another feature of this invention is the provision of a process for decausticizing viscose or analogous polysaccharide xanthate solutions by treatment with an ion exchange resin in the non-hydroxyl or salt form.

Still another feature of this invention is the provision of a process for decausticizing viscose or analogous polysaccharide xanthate solutions by treatment with an ion retarding resin.

Another feature of this invention is the provision of a process wherein viscose or an analogous polysaccharide xanthate solution is purified by dialysis.

Another feature of this invention is the provision of a novel composition comprising a polysaccharide xanthate solution having a pH of about 4 to 13 and substantially free of regenerated polysaccharide.

Still another feature of this invention is the provision of a novel composition comprising an aqueous solution of a polysaccharide xanthate having a pH of about 8 to 13 and substantially free of regenerated polysaccharide and alkalization and xanthation by-products.

Still another feature of this invention is the provision of a novel composition comprising a decausticizing polysaccharide xanthate having a pH of about 4 to 8 and containing a substantial proportion of free xanthic acid groups.

Still another feature of this invention is the provision of a novel composition comprising a decausticized aqueous amylose xanthate.

Still another feature of this invention is the provision of a new and improved method of preparing a high wet and dry strength paper by impregnation with a decausticized aqueous solution of a polysaccharide xanthate followed by regeneration of the polysaccharide within the paper.

Still another feature of this invention is the provision of a new and improved method of preparing a high wet strength paper by impregnation with a decausticized aqueous solution of a polysaccharide xanthate followed by regeneration of the polysaccharide within the paper by thermal treatment or by treatment with acid.

Still another feature of this invention is the provision of a novel thermally regenerated amylose product.

Still another feature of this invention is the provision of a novel thermally regenerated cellulose product.

Other objects and features of this invention will become apparent from time to time throughout the specification and claims as hereinafter related.

SUMMARY OF THE INVENTION

In the preparation of viscose and other polysaccharide xanthates, many undesired by-products are formed. In the past, viscose and other polysaccharide xanthate solutions have been regenerated by treatment with an acid with the result that large amounts of salts are formed within the regenerated material. It has hitherto been impractical to reduce the proportion of salts in the regenerated polysaccharide by neutralization of the aqueous caustic solution due to the fact that any attempt to neutralize excess caustic with strong acid results in a localized region of very low pH and high salt concentration which tends to coagulate the polysaccharide and produce a heterogeneous product.

This invention is based upon the discovery that polysaccharides, principally film-forming polysaccharides, such as cellulose, starch, amylose, dextran, etc., in the form of caustic xanthate solutions can be decausticized by dialysis, ion exchange, and/or ion retardation. The process is of primary interest for decausticizing viscose solutions or caustic solutions of amylose xanthate but is equally applicable to decausticizing caustic aqueous solutions of other polysaccharide xanthates. In carrying out the process of this invention, the reaction conditions are not especially critical. It is preferred to work with the viscose or other polysaccharide xanthate solutions in somewhat dilute form for convenience in handling. In general, it is preferred to work with aqueous caustic solutions containing 0.1 to 7.0% wt. of polysaccharide as the xanthate. At higher concentrations of the polysaccharide xanthate, there is a tendency for the composition to set into a thin gel. The gelation of the mixture, however, does not render the process inoperative but necessitates the use of high pressure apparatus to maintain an adequate rate of flow. The use of lower concentrations of the polysaccharide xanthate in solution presents no problems other than the removal of excess water for certain end uses of the decausticized product. In purifying the viscose or other polysaccharide xanthate by dialylsis, it is preferred to dilute the caustic solution to avoid the formation of a gel as the solution is decausticized. The process can be carried out batch-wise or continuously. A convenient batch method dialysis consists of filling a bag or tube of regenerated cellulose film, parchment, etc., with dilute viscose and placing the filled bag in distilled or deionized water with agitation. After several changes of water around the bag, the viscose solution is substantially decausticized and has a pH of about 9 to 10. Continuous dialysis can be carried out using continuous dialyzers of the type well known in the art for recovering spent caustic from the alkali treatment of cellulose in the initial step in the preparation of viscose. Another convenient continuous dialysis process is to pass the viscose solution through a tube of regenerated cellulose film positioned within a pipe or other conduit through which distilled or deionized water is passed, countercurrently to the flow of viscose within the tube. If desired, the tube can be supported in a flattened position to maintain a very high surface area to volume ratio to make the dialysis more efficient.

PURIFICATION OF XANTHATES BY DIALYSIS

The following nonlimiting examples are illustrative of the purification of polysaccharide xanthate solutions by dialysis.

*Example 1*

A commercial viscose solution was purified by a batch dialysis technique. The viscose used was a commercial viscose solution, ripened and ready for extrusion, and containing about 8% cellulose, 6.6% total alkali (total of free sodium hydroxide and combined sodium in the cellulose xanthate), 0.9% xanthate sulfur, and having a D.P. of about 500 (D.P. is degree of polymerization and represents the average number of anhydroglucose groups per cellulose molecule). The viscose was diluted to a 4% cellulose content and 600 ml. of the dilute viscose was placed in a bag of regenerated cellulose film. The dialysis bag consisted of a 72-inch length of 0.8-inch diameter tubing regenerated cellulose film tied at both ends. The bag of diluted viscose was placed in a 9-liter bottle and the bottle filled with water. The bottle was shaken for about twenty minutes at 15° C. at 160 cycles per minute on an Eberbach shaker. The water was decanted and the bottle again filled with fresh water and shaken for a one-hour period at 15° C. The water was changed again for two additional periods of one hour each at which time the dialysis was complete. The bag of dialyzed viscose was removed from the bottle and placed in a cooler maintained at about 4° C. for eighteen hours. At the end of this storage period the viscose had assumed the form of a soft gel that could be extruded from the bag. The gel was diluted to 2% cellulose content using a blender to produce a viscous liquid having a pH of 11.

In another experiment the dialysis of viscose was again carried out but using an acid form cation exchange resin to maintain a high concentration gradient through the dialysis membrane to avoid use of large volumes of distilled water in the dialysis. A 60-inch long tube of regenerated cellulose was tied at one end to form an elongated bag. At the end of the bag was placed about 20 g. Amberlite IRC 50 H (a carboxylic exchange resin in the acid form) and 50 ml. of water. The casing was then tied and additional amounts of water and ion exchange resin added and the bag again tied. This arrangement was repeated until a string of five batches of resin and water were obtained. This dialysis membrane containing acid form cation exchange resin beads was then placed in a wide mouth bottle containing 800 g. of viscose having a 4.1% cellulose content (made by dilution of 8% cellulose content commercial viscose). The bottle was stoppered and shaken at 320 cycles per minute for two and one-half hours. The shaker bed was at a temperature of about 32° C. When the dialysis was complete, the dialysis membrane was removed from the bottle and the cellulose xanthate solution which remained had a pH of 11.4. The dialyzed viscose which was thus produced was a viscous liquid of just barely pourable viscosity. The increase in viscosity was partially caused by decausticization of the viscose but was also due to a ripening of the diluted viscose as a result of being held at a temperature of 32° C.

The decausticized viscose produced in these experiments is useful in the formation of thermally regenerated cellulose films and as an adhesive or laminating agent. A small portion of the decausticized viscose was formed into a thin film and heated to about 120° C. At this temperature the film was converted to regenerated cellulose in about 60 seconds. A small portion of the 2% cellulose content decausticized viscose was used as an adhesive. About three drops of the decausticized viscose were applied per foot of 0.4-inch wide seam along one edge of a length of 14.5 lb. hemp tissue paper. The paper was formed into a cylinder with the viscose functioning as an adhesive. The seam which was formed was dried by heating to cause the decausticized viscose to decompose into regenerated cellulose. Several heating techniques were used. In one case the seam was heated with an infrared lamp. In another case the seam was dried in an oven at 70° C. for seven minutes. In a third experiment the wet seam was heated in a polyethylene heat sealer at 210° F. for about one minute. In each case the rewet seam had a shear strength in excess of 10 lb. per linear inch of seam.

*Example 2*

When dialysis of viscose is carried out at a higher degree of dilution, there is less tendency for gel formation. A commercial viscose as used in Example 1 was diluted to a cellulose content of about 0.5%. A 500 ml. portion of the diluted viscose was placed in a bag formed from a length of regenerated cellulose tubing. The bag was closed at both ends and placed in a 9-liter bottle and shaken for an extended period of time as in Example 1. At the end of the dialysis period the bag was removed from the bottle and the contents withdrawn as a viscous liquid. The dialyzed viscose from this experiment had a pH of about 9.2 and can be thermally regenerated as in Example 1.

*Example 3*

A high purity amylose (derived from corn) containing about 10% water and having a D.P. of about 700–900 was used in the formation of an amylose xanthate solution analagous to viscose.

An alkaline solution of 24% concentration (1580 g. water and 300 g. sodium hydroxide) was prepared and mixed with 300 ml. methanol and 150 g. amylose. The thick slurry which was formed was stirred for ten minutes and 200 ml. additional methanol added, and the more dilute slurry stirred for one hour at 25° C. The slurry was then mixed with 5.1 liters of methanol to precipitate and shrink the amylose. The supernatant layer was decanted and found to contain 270 g. of sodium hydroxide. The gel which remained was left to dry in thin layers and to depolymerize or age.

The alkali amylose which was produced was allowed to dry and age for forty-three hours at 25° C. to reduce the D.P. of the amylose so that high amylose xanthate concentrations in alkali could be obtained. The gel weight was about 870 g. and comprised 12.6% alkali, 16% amylose, and 71% water.

The amylose xanthate (870 g.) was spread on the bottom and on the porcelain plate of a 12-inch vacuum desiccator. Nitrogen purging was carried out and a vacuum was then applied. About 70 g. of carbon disulfide was drawn into the desiccator and the system allowed to stand in a water bath at 25° C. After about 5.25 hours the alkali amylose had turned to a carrot yellow-orange color. The vacuum was applied to the desiccator to remove excess carbon disulfide for a period of about twenty minutes. The product obtained consisted of 898 g. of sodium amylose xanthate. This material was refrigerated at −20° C. for six days before solutions were prepared from it.

One solution was prepared by mixing the sodium amylose xanthate with an equal weight of water for two hours using a 2½-inch marine-type propeller as an agitator. The mixture was maintained at a temperature less than 15° C. during solution. The resulting viscous solution was filtered through a filter muslin and had a 6% alkali content (both free sodium hydroxide and combined sodium) and 8% amylose. A portion of this solution was further diluted to form a 4% amylose solution.

Both the 4% and 8% amylose solutions were decausticized by dialysis. About 100 g. of each solution was placed in a cellulose bag as in Example 1 and dialyzed by shaking the bag in 1.5 liters of water in a polyethylene bottle at 320 cycles per second. The water was changed twice at 20-minute intervals, and then it was changed again and the system allowed to stand at 25° C. overnight. The solutions both had a pH of 11.5 at the end of the dialysis. Both decausticized amylose xanthate solutions could be readily removed from the dialysis bags. The 4% amylose xanthate solution was removed as a viscous solution while the 8% solution was removed as a gel.

Viscose, aqueous alkaline solutions of amylose xanthate, and other polysaccharide xanthate solutions which have been decausticized by dialysis have substantially all of the free alkali removed as well as a major part of the alkalization and xanthation by-products. The purification of viscose and related polysaccharide xanthate solutions by dialysis is effective to produce a xanthate solution from which approximately two-thirds of the total alkali has been removed and which can be readily regenerated by heat or acids.

DECAUSTICIZING XANTHATE SOLUTIONS BY CATION EXCHANGE

Viscose and analagous polysaccharide xanthate solutions can be purified and reduced in pH by treatment with cation exchange materials in the hydrogen ion or acid form. The free alkali in viscose (and related polysaccharide xanthate solution) and a substantial portion of the combined alkali can be removed by neutralization with a cation exchange material in the hydrogen ion or acid form. In general, the reaction is carried out by merely mixing the viscose (or analagous solution) with the cation exchange resin which results in a rapid reaction removing most of the basic impurities. The reaction which takes place is straight forward neutralization reaction, is quite rapid, and seems to be limited only by the rate of diffusion of the alkali into contact with the acidic sites on the ion exchange material. While the process is most effective when used with commercially obtainable, high capacity ion exchange resins, it is effective to a substantial degree with any material having cation exchange properties which can be converted to the acid form by treatment with a strong acid. In general, the neutralization of free alkali (and part of the combined alkali) and polysaccharide xanthate solution can be carried out using cation exchange materials in a definite and predetermined manner with the result that the pH of the resulting material can be calculated in advance by an evaluation of the stoichiometry of the reaction. The following ion exchange materials are illustrative of cation exchangers which can be used in this process: sulfonated phenol-formaldehyde resins (prepared by condensation of phenol sulfonic acid with formaldehyde, or by alkaline condensation of sodium phenolate with sodium sulfite and formaldehyde), e.g. Zeo-Karb 215, Zeo-Karb 315, Amberlite IR 1, Amberlite IR 100, Duolite C 10, Duolite C 3, Dowex 30; polystyrene sulfonates cross-linked with divinyl benzene, e.g. Zeo-Karb 225, Amberlite IR 120, Duolite C 20, Dowex 50, and Nalcite HCR; sulfonated coal, e.g. Zeo-Karb H 1; nuclear substituted polystyrene phosphonate resins, e.g. Duolite C 60 and Duolite C 61; carboxylic resins, e.g. carboxylated phenol-formaldehyde resins, Zeo-Karb 216, and co-polymers of acrylic acid with divinyl benzene: Zeo-Karb 226, Amberlite IRC 50, Duolite CS 100, acid treated zeolites; naturally occurring non-resinous ion exchange materials, e.g. cellulose, wood fibers (bast fiber) including fabricated forms thereof such as webs, papers, fabrics, and the like. The reference to ion exchange resins in the claims is intended to be generic to ion exchange material of the high capacity resinous type, to liquid ion exchangers, and to naturally occurring non-resinous ion exchange materials such as acid treated coal, cellulose wood fibers, fabrics, webs, papers, and the like which are known to have cation exchange properties.

The following non-limiting examples are illustrative of the purification of xanthate solutions by cation exchange.

*Example 4*

An 8% cellulose content viscose, as used in Example 1, was diluted with distilled water to a 0.5% cellulose content. Amberlite IRC 50 H resin beads were added incrementally to the diluted viscose with mechanical stirring over a period of about ten minutes at 25° C. until the pH reached a value of about 8. A clear light amber color liquid resulted. The liquid was filtered through a filter muslin and had a viscosity of 5.1 cp. at high shear and 7.8 cp. at low shear.

In an additional series of experiments, viscose containing higher proportions of cellulose was treated with a cation exchange resin by passing the viscose through a column of resin designed for pressure operation. The column consisted of a 2" (O.D.) x 30" stainless steel tube provided with end taps having O-ring seals and 100 mesh stainless steel screens backed by 14 mesh screens for supporting the resin bed. In using the column, coarse glass wool was first placed over the screen and the bottom of the column. A portion of Amberlite IRC 50 H resin was pre-treated with water to prevent excessive compacting of the resin due to swelling on initial wetting. The moist resin was added to the column and tamped to minimize channeling during the ion exchange reaction. In one experiment the column was partially filled with 150 g. Amberlite IRC 50 H resin. 600 g. of 2% cellulose content viscose was added to the column. The pressure on the column was gradually increased to 30 p.s.i.g. over about five minutes. 600 g. of decausticized viscose was eluted from the column in three minutes after the pressure reached 30 p.s.i.g. The initial effluent from the column had a pH of 5.5. The final effluent from the column had a pH of about 8.4 which increased to 9.0 after about four hours' storage.

In another experiment the column was charged with 100 g. Amberlite IRC 50 H covered with a 0.75-inch layer of Amberlite IRC 50 Na. 547 g. of 3% cellulose content viscose was introduced to the column and a pressure of about 60 p.s.i.g. applied at once. At the end of about thirty minutes, 540 g. of the viscose had been recovered. The initial effluent from the column had a pH of 5.0 which rose to a value of about 8.5 after the first 50 ml. The pH of the viscose remained at about 8.5 until completely eluted from the column and gradually increased to a value of 9.8 after about three hours at 25° C.

In another experiment a column was charged with 100 g. Amberlite IRC 50 H covered with a 0.5-inch layer of Amberlite IRC 50 Na. 700 g. of 2.5% cellulose content viscose was added to the column and a pressure of 55 p.s.i.g. applied immediately thereto. The entire 700 g. of viscose was eluted from the column in about 4.5 minutes. The effluent from the column had a pH of 12.5.

In other experiments dilute viscose solutions (0.5% cellulose) were passed through the column under gravity feed and at various pressures with the result that decausticized viscose solutions of pH varying from 5 to 10 were obtained.

*Example 5*

In another experiment a dilute viscose was prepared by diluting 25 g. of 8% cellulose content viscose to 250 ml. with distilled water. To the resulting solution was added 20 ml. of 50 to 100 mesh Dowex 50Wx8 sulfonic acid type resin in the hydrogen ion or acid form. The solution was stirred for a few minutes and a clear amber liquid recovered. The liquid had a pH of 11.5 and did not coagulate or gel over a period of twenty-four hours at 25° C.

*Example 6*

A composition of viscose (or analagous polysaccharide xanthate solutions) which has been decausticized by cation exchange cannot be simply defined. The viscose starting material contains at least ten types of molecular species, many of which are in transient equilibrium. Ion exchange will, in general, shift these equilibria to give the free acids. The nature of the products also depends somewhat upon the speed of the ion exchange reaction or the contact time with the resin. This is because of the fact that, while the free sodium (or other alkali) ions in the viscose are being neutralized by the ion exchange resin to produce cellulose xanthic acids, the resulting product will hydrolyze to produce additional amounts of free alkali. However, this hydrolysis takes time and the composition of the resulting product, therefore, varies somewhat with the time required for the neutralization or ion exchange reaction. The composition of the decausticized viscose also depends to some extent upon the time that it has been held before use.

In a series of experiments a 0.5% cellulose content viscose was neutralized or decausticized by treatment with Amberlite IRC 50 H resin to various degrees (pH ranging from 9.3 down to 6.5). Analysis of the decausticized viscose having a pH of 6.9 showed that the composition contained about 57% of its xanthate content in the form of free xanthic acid groups. At a pH of 7.3 the viscose contained 56% of its xanthic content in the form of free xanthic acid groups. Viscose which was decausticized to a pH of 8.1 was found to contain 17% of its xanthic content in the form of free xanthic acid groups. On the other hand, viscose which was decausticized to a pH of 9.3 contained no free xanthic acid groups.

*Example 7*

An 8% cellulose content viscose as was used in Example 1 was diluted to a 0.3% cellulose content with distilled water. A 250 ml. portion of the diluted viscose was slurried with 5.5 g. bast fibers which had been acid treated to convert the ion exchange sites thereon to the acid or hydrogen ion form. At the end of ten minutes the slurry was filtered and the dilute viscose was recovered as a light amber colored fluid having a pH of about 9.0.

*Example 8*

An 8% amylose content solution of sodium amylose xanthate was prepared as described in Example 3 and diluted with an equal volume of distilled water to produce a solution having a 4% amylose content. This solution was mixed with Amberlite IRC 50 H resin to neutralize and decausticize it. Small samples of the solution were decanted at various intervals during decausticizing to obtain samples of decausticized amylose xanthate at various pH levels. Solutions which were recovered had a slight greenish cast but were otherwise similar to decausticized viscose. Samples of the decausticized sodium amylose xanthate solution were taken at pH values of 10.5, 9.5, 8.7, 8.4, and 7.6. The decausticized amylose xanthate tends to hydrolyze and increases slightly in pH on extended storage. After about seventeen hours' storage the increase in pH of various samples was only slight and an equilibrium value of about 10–10.5 was reached after several days. At about eleven days' storage the solutions gelled. Decausticized amylose xanthate solutions which are prepared in this manner can be regenerated by treatment with acid or can be thermally regenerated. At low pH values, e.g. 7 and lower, the decausticized amylose xanthate contains a substantial proportion of its xanthate content in the form of free xanthic acid groups.

*Example 9*

The ion exchange column as described in Example 4 is charged with 150 g. Duolite C 60 resin. About 500 ml. of 0.5% cellulose content dilute viscose is allowed to feed through the column under gravity feed at a rate of about 1 ml. per minute. The effluent from the column is collected and consists of a light-amber colored liquid having an initial pH of about 6.

*Example 10*

The ion exchange column as described in Example 4 is charged with 150 g. Zeo-Karb 226 resin. About 500 ml. of 0.5% cellulose content dilute viscose is allowed to feed through the column under gravity feed at a rate of about 1 ml. per minute. The effluent from the column is collected and consists of a light-amber colored liquid having an initial pH of about 6.

*Example 11*

The ion exchange column as described in Example 4 is charged with 150 g. Amberlite IR 120 resin. About 500 ml. of 0.5% cellulose content dilute viscose is allowed to feed through the column under gravity feed at a rate of about 1 ml. per minute. The effluent from the column is collected and consists of a light-amber colored liquid having an initial pH of about 6.

*Example 12*

The ion exchange column as described in Example 4 is charged with 150 g. Dowex 50X4 H resin. About 500 ml. of 0.5% cellulose content dilute viscose is allowed to feed through the column under gravity feed at a rate of about 1 ml. per minute. The effluent from the column is collected and consists of a light amber colored liquid having an initial pH of about 6.

DECAUSTICIZATION BY ANION EXCHANGE

Viscose and similar polysaccharide xanthate solutions can be purified by treatment with an anion exchange material in a manner somewhat similar to the purification using cation exchange resins. In the anion exchange treatment the material used is preferably a strong base or intermediate base anion exchange resin in the salt form (non-hydroxyl form). When the viscose solution is contacted with an anion exchange resin in the salt form, the hydroxyl groups in the solution exchange with ionizable salt groups on the resin. If the viscose solution is merely mixed with an anion exchange resin, the hydroxyl groups from the solution will reach equilibrium with the salt groups ionized from the resin and there will be only a partial decausticization of the viscose. However, if the viscose is fed through a column containing the resin, a relatively high ion concentration gradient is maintained between the solution and the resin with the result that a substantially complete removal of hydroxyl ion from the viscose is effected. When an anion exchange resin is used in this manner for decausticizing viscose, it is effective not only to remove hydroxyl ions from the solution but also to remove the ions of contaminating by-products such as trithiocarbonates, mono and dithiocarbonates, thiosulfates, perthiocarbonates, and sulfides, which are produced as by-products in the xanthation process. The treatment of viscose and similar solutions with anion exchange resins has the advantage of removing salt by-products which tend to discolor the viscose but has the disadvantage of substituting the anion of the ion exchange resin for the hydroxyl ions in the solution with the result that the decausticized viscose contains an amount of sodium salt which is substantially equivalent to the alkali content of the viscose as initially formed. In carrying out the decausticization of polysaccharide xanthate solutions with anion exchange materials, any of the commercially available ion exchange resins can be used as well as naturally occurring materials which inherently possess ion exchange properties. Examples of ion exchange materials which can be used in the decausticization of polysaccharide xanthate solutions by anion exchange include but are not limited to the following: intermediate base anion exchangers, e.g. (cross-linked polystyrene quaternarized with dimethylethanolamine) Dowex 2, Amberlite IRA 410, Nalcite SAR; strong base anion exchangers, e.g. (cross-linked polystyrene quaternarized with trimethylamine) De-Acidite FF, Amberlite IRA 400, Dowex 1; porous anion exchangers, e.g. Decolorite and Duolite S 30, as well as naturally occurring anion exchangers, e.g. proteins containing ionizable amino groups, polymeric betaines, etc.

The method of preparation, properties, and chemical identification of the various ion exchange materials mentioned above are found in a variety of recent textbooks on the subject of ion exchange, viz., Ion Exchange and Its Applications, The Society of Chemical Industry, 1955, pp. 55–57, 63, 64; Ion Exchange, A Laboratory Manual, Salmon and Hale, Academic Press, Inc., 1959, pp. 14–30; Ion Exchange Resins, Kunin and Myers, John Wiley & Sons, 1950, pp. 51–63; and, Ion Exchange, Helfferich, McGraw-Hill Book Co., 1962, pp. 10–71, 574–584.

The following non-limiting examples are illustrative of the decausticization of polysaccharide xanthates by anion exchange.

*Example 13*

A glass column having an I.D. of 1 cm. was filled to a depth of 20 cm. with 50 mesh Dowex 1 X 4 Cl anion exchange resin. An 8% cellulose content viscose was diluted to a 0.5% cellulose content and fed through the column under a pressure of 0.5 p.s.i.g. at a rate of 1 ml./min. The effluent from the column had a substantially constant pH of 11.8 and was a clear colorless liquid.

In another experiment the glass column was filled to a depth of 20 cm. with 100–200 mesh Dowex 1 X 8 Cl. The 0.5% cellulose content viscose solution was fed through this column under a pressure of 3 p.s.i.g. at a rate of 0.5 ml./min. The effluent from the column had a substantially constant pH of 11.8.

In another experiment the glass column was filled to a depth of 20 cm. with a 100–200 mesh Dowex 1 X 8 Cl anion exchange resins. The 0.5% cellulose content viscose was fed through the column under gravity feed at a rate of 0.4 ml./min. The effluent from the column had a substantially constant pH of 11.8.

*Example 14*

A glass column as used in Example 13 was filled to a depth of 30 cm. with 50 mesh Dowex 1 X 4 Cl anion exchange resin. A solution of amylose xanthate diluted to an amylose content of 0.5% is passed through the column under gravity feed at a flow rate of about 0.5 ml./min. The effluent from the column had a substantially constant pH of about 11.

*Example 15*

A glass column having an I.D. of 1 cm. was filled to a depth of 20 cm. with 50 mesh Dowex 2 X 4 Cl anion exchange resin. An 8% cellulose content viscose was diluted to a 0.5% cellulose content and fed through the column under a pressure of 0.5 p.s.i.g. at a rate of 1 ml./min. The effluent from the column had a substantially constant pH of 11.8 and was a clear gray-green liquid. The resin bed became carrot colored (due to absorption of trithiocarbonate impurities) at the top one-half inch of the column.

*Example 16*

A glass column having an I.D. of 1 cm. was filled to a depth of 20 cm. with 50 mesh Amberlite IRA 400 $NO_3^-$ anion exchange resin. An 8% cellulose content viscose was diluted to a 0.5% cellulose content and fed through the column under a pressure of 0.5 p.s.i.g. at a rate of 1 ml./min. The effluent from the column had a substantially constant pH of 11.8 and was a clear colorless liquid.

*Example 17*

A glass column having an I.D. of 1 cm. was filled to a depth of 20 cm. with 50 mesh Nalcite SAR $NO_3^-$ anion exchange resin. An 8% cellulose content viscose was diluted to a 0.5% cellulose content and fed through the column under a pressure of 0.5 p.s.i.g. at a rate of 1 ml./min. The effluent from the column had a substantially constant pH of 11.8 and was a clear colorless liquid.

DECAUSTICIZATION OF POLYSACCHARIDE XANTHATE SOLUTIONS BY ION RETARDATION

Ion retardation resins constitute a new class of ion exchange resins. They are prepared by polymerizing an anionic monomer inside the pores of an anion exchange resin or a cationic monomer inside the pores of a cationic exchange resin. The resulting linear polymer is trapped inside the crosslinked ion exchange resin and cannot diffuse out. The resin system is physically and chemically stable and comprises a mixture of cation and anion exchangers with the mixing taking place at the molecular level. In an ion retardation resin the anionic and cationic absorption sites are so closely associated that they partially neutralize each other's electrical charges. However, the sites still have an attraction for mobile anions and cations and can associate with them to some extent. The result is that the resin will absorb both anions and cations from solutions with which it comes in contact, but the absorbed ions can be displaced from the resin by the use of water as an eluent. Ion retardation resins may be utilized in batch operations. However, since absorbed ions are only weakly held, their removal from solution is incomplete even in the presence of excess resin, and hence a column operation is generally prefered. In column operations, the solution to be treated is fed through the resin bed until the ion absorbing capacity of the bed is utilized as completely as possible. The absorbed ions are then eluted by rinsing the bed with water.

Example 18

In one experiment a column of ion retardation resin was prepared which was 2.5 cm. diameter by 25 cm. in depth. The resin used was Retardion 11 A 8 (product of the Dow Chemical Company) which is a 50–100 mesh resinous material prepared by polymerizing acrylic acid inside Dowex 1 (a quaternary, strong-base, styrene resin manufactured by the Dow Chemical Company). The resin was soaked in water to remove soluble impurities and to cause the resin to expand to its wet size. The preliminary washing of the resin is desirable to prevent breakage of the glass column when the resin swells upon wetting. An 11 g. portion of 8% cellulose content (6% alkali) viscose was diluted with 77 g. water to produce 88 g. of a 1% cellulose content viscose solution. The dilute viscose was introduced into the top of the column and allowed to flow through by gravity. The cellulose was eluted from the column with distilled water and had a pH averaging about 12. At a pH of 12 more than 99.9% of the free alkali in the viscose has been removed. The recovery of the dilute viscose from the column was essentially quantitative and the decausticized product was colorless, substantially free of impurities, and could be thermally regenerated into a clear film. At the end of the run there was a carrot-colored band about 2.5 inches long at the top of the column which represented the portion of the resin bed used in absorbing the colored trithiocarbonate impurities.

In another experiment 39 g. of viscose (7.4% cellulose, 61% alkali) was diluted to a 1% cellulose content. The liquid was passed by gravity flow through a 1.5 cm. x 65 cm. column of Retardion 11 A 8. The effluent which was recovered from the column (total time of run: 3 hours) had a pH of 11.2–11.5. This treatment removed 75% of the alkali (100% of free alkali) so that the only alkali remaining was that associated with the cellulose xanthate.

Example 19

A column of Retardion 11 A 8 resin 2.5 cm. in diameter by 24 cm. in height is prepared as described in Example 18. An 8% amylose content solution of amylose sodium xanthate is prepared as described in Example 3 and is diluted to a 1% amylose content solution. 90 g. of the 1% amylose content solution is then allowed to flow by gravity through the resin bed. The effluent from the column has an average pH of about 12, which represents substantially complete removal of all free alkali in the solution.

DECAUSTICIZATION OF VISCOSE BY LIQUID ION EXCHANGER

In some cases the use of a liquid ion exchanger is advantageous in continuously decausticizing viscose (or other polysaccharide xanthates) because the liquid exchange medium can be continuously removed and regenerated.

Example 20

A solution (liquid ion exchanger) was prepared by dissolving 20 g. of monolauryl acid orthophosphate in 50 ml. of carbon tetrachloride. A turbid dispersion resulted. A 250 ml. beaker was charged with 100 ml. of diluted (0.5% cellulose) viscose and the liquid ion exchanger slowly added with stirring. Spontaneous emulsification took place and the pH decreased slowly to pH 9. The mixture was centrifuged to break the emulsion and the decausticized (pH 9) viscose recovered as a clear amber liquid. The product can be thermally regenerated into cellulose film or fiber (or other shapes) and can be used as a high wet (and dry) strength size for paper. The liquid ion exchange process is similarly useful in the decausticizing of other polysaccharide xanthates. Other liquid ion exchangers (both anion and cation type), well known in the art, can be used in this process.

COMBINATION PROCESSES FOR DECAUSTICIZATION OF POLYSACCHARIDE XANTHATE SOLUTIONS

While the several processes of dialysis, ion exchange, ion retardation, etc., described above are effective in decausticizing polysaccharide xanthate solutions alone, these processes are also effective and in some cases more efficient when used in conjunction with one another. Thus, cation and anion exchange resins can be used for sequential treatment of xanthate solutions, and mixtures of resins in the form of a mixed bed can similarly be used. Also, a combination of dialysis and ion exchange is especially effective in decausticizing polysaccharide xanthate solution.

Example 21

A 4% amylose content amylose xanthate solution was prepared as described in Example 3. About 100 g. of solution was placed in a regenerated cellulose bag and dialyzed by shaking the bag in 1.5 liters of water in a polyethylene bottle at 320 cycles per minute. The water was changed twice at twenty minute intervals, then it was changed again and the system left standing at 25° C. overnight. The amylose xanthate solution was recovered from the dialysis bag as a viscous liquid having a pH of 11.5. A portion of the pH 11.5 amylose xanthate solution recovered from the dialysis bag was mixed with Amberlite IRC 50 H resin to further remove sodium ion therefrom. The solution was separated from the exchange resin and was found to have a pH of 6.5. This low pH amylose xanthate solution is quite viscous and can be regenerated in the form of a film or filament of amylose by acid treatment or by heat. In addition, when the amylose xanthate solution is formed into a thin film, it is regenerated into amylose by standing at room temperature for several days.

Example 22

A 1% cellulose content viscose was subjected to dialysis as described in Examples 1 to 3 to produce a decausticized product having a pH of about 12. The decausticized viscose was then mixed with a cation exchange resin, Amberlite IR–120–H, to further remove sodium ions therefrom. The viscose which was recovered from admixture with the resin was a viscous light-amber colored liquid having a pH of about 6.

Example 23

A 1% cellulose content viscose was subjected to dialysis as described in Examples 1 to 3 to produce a decausticized product having a pH of about 12. The decausticized viscose was then mixed with a cation exchange resin, Zero-Karb 226, to further remove sodium ions therefrom. The viscose which was recovered from admixture with the resin was a viscous light-amber colored liquid having a pH of about 6.

Example 24

In another experiment a 1 cm. by 25 cm. column of 20–50 mesh Dowex 1X4 resin (in the chloride form) was prepared for anion exchange. A 0.5% cellulose content viscose solution, freshly diluted, was fed into the column under a pressure of about 1 p.s.i.g. A colorless effluent was recovered from the column at a rate of about 12 ml./min. having a pH slightly in excess of 12. The sulfur by-products in the viscose produced a carrot colored band near the top of the resin bed.

The effluent of the anion exchange column was then passed through a column of the same size of Amberlite IRC 50 H resin to give a colorless, odorless effluent. The solution had an initial pH of 7.6 and remained fluid for three hours. On storage overnight the purified viscose set into a clear, firm gel.

Example 25

In another experiment about 200 ml. of a 1% cellulose content viscose solution was neutralized to pH 10 using Amberlite IRC 50 H resin mixed into the beaker containing the solution. The product which was recovered was a fawn colored solution. The liquid was decanted and about 20 g. of air-dried Dowex 1X4 anion exchange resin mixed therewith for a period of about ten minutes. The solution which was recovered from the resin was clear, colorless, and odorless having a pH of about 10. The solution which was recovered was formed into a 0.5 mil. film and dried at 100° C. A regenerated cellulose film was formed therefrom which was clear and light yellow in color.

Example 26

In another experiment a mixed bed ion exchange resin was prepared by mixing about 15 g. of Amberlite IRC 50 H cation exchange resin with 13 g. of Dowex 1X8 OH anion resin. The mixed resin was added to 150 ml. of 1% cellulose content diluted viscose and stirred for ten minutes. The supernatant solution which was recovered was a clear, colorless solution having a pH of 7.2 and which did not gel in three hours' storage.

In the several experiments described above, considerable emphasis is placed upon the applicability of the processes of dialysis, anion exchange, cation exchange, and ion retardation, either alone or in combination, for purifying and neutralizing viscose or amylose xanthate solutions. It should be understood, however, that these processes are equally applicable to the decausticization of other caustic alkaline solutions of polysaccharide xanthates, particularly the film-forming polysaccharide xanthates. Thus, the proccesses described for the decausticization of viscose can be used for removing alkali and reaction by-products from caustic solutions of film-forming materials such as the alkali xanthates of starch, dextran, and other polysaccharides which can be regenerated in film form from solutions of their xanthates.

CHARACTERIZATION OF DECAUSTICIZED VISCOSE BY INFRARED SPECTROSCOPY

A series of experiments were carried out in which viscose was decausticized and infrared spectra obtained. A 2% cellulose content ice cold viscose was passed through a column of Dowex 1 OH (anion resin in OH form) to remove trithiocarbonates and other impurities. The purified (but still caustic) viscose was then passed through a column of Amberlite IRC 50 H (cation resin, acid form) to remove free and combined alkali. Samples were taken at different stages of decausticization and tested as follows:

A sample of decausticized viscose (pH 5.6) was poured over a clean 24 mesh Saran screen to provide a film for infrared measurements using a laboratory infrared spectrophotometer. The IR spectrum showed peaks at $3.0\mu$, shoulders at 4.25 and $6.10\mu$, shallow peak at $6.2-6.4\mu$, broad peak at $7.4-7.8\mu$, shoulder at $8.7-8.8\mu$, and intense peak at $9.45-9.65\mu$.

A sample of decausticized viscose (pH 7.9) was tested as described above. The IR spectrum showed peaks at 3.05, 3.55, 6.65, 7.35–7.45, 8.7–8.8, 9.45–9.65, and $11.25\mu$, and shoulders at 7.15, 7.70, and $8.4\mu$.

A sample of pH 11.8 product showed peaks at 3.0, 3.5, 9.4–9.6, and 11.15–11.15$\mu$, and shoulders at 4.00–4.25, 4.6, 6.74, and $7.44\mu$.

The IR spectrum of untreated 2% viscose was obtained and showed peaks at 3.0, 3.55, 6.30, 7.15, 9.5–9.8, and $11.4\mu$, and shoulders at 4.1 and $4.65\mu$. The principal distinction in the IR spectra is presence in the untreated viscose of a strong peak at about $7\mu$ which is substantially absent in the decausticized viscose.

USES OF DECAUSTICIZED POLYSACCHARIDE XANTHATE SOLUTIONS

Decausticized viscose and other decausticized polysaccharide xanthates are useful for a variety of purposes for which the caustic materials would have little or no application. The decausticization of polysaccharide solutions reduces considerably the formation of by-product materials upon regeneration of the polysaccharide. The decausticized polysaccharide xanthate solutions can be regenerated by treatment with acid as can the unpurified materials. However, the decausticized polysaccharide xanthates can be regenerated thermally in a very short time or by standing for an extended period of time at room temperature. In view of the very large number of applications of the decausticized polysaccharide xanthate solutions, particularly decausticized viscose, it is desirable to set forth a number of such uses in more detail.

Example 27

A clear dilute viscose (0.7% cellulose content) having a pH of 11.6 was prepared by decausticization of dilute viscose by anion exchange as described in Examples 13 to 17. This dilute decausticized viscose was used to coat the fibers in paper to produce a high wet strength product. Several types of paper and several coating techniques were investigated. The papers which were used were a 15 lb. hemp paper, starch-sized onion skin paper, and 10 lb. wood pulp paper. Portions of each paper were coated with the decausticized viscose by dipping, by floating the paper on the viscose, and by spraying the viscose on both sides of the paper. In the laboratory scale evaluation of these papers, no substantial difference in effect was observed resulting from the coating technique although coating techniques which are used in impregnation and the coating of paper with wet strength resins in commercial paper plants would probably be more effective. The several papers which were coated were dried at 80–100° C. for several hours. The wet strength of the paper increased from ten to fifteenfold in the cellulose addon range of about 0.5 to 4%. The dry strengths of the paper were increased 20 to 50% in the same range. The dry burst strengths were increased twofold while the wet burst strengths were increased up to eightfold.

Several additional experiments were carried out in which a 14.5 lb. wood fiber tissue paper was impregnated with varying amounts of decausticized viscose. The untreated tissue paper had a dry strength of 4800 g./in. and a Scott wet strength of 133 g./in. The tissue paper was coated by floating a length of 6 to 9 inches of the paper on the surface of the decausticized viscose in a flat pan. The paper was then passed under an aluminum roller and vertically into a flash dryer consisting of three infrared quartz rods on each side of the paper perpendicular to the direction of paper travel and in a plane parallel thereto. The oven was only sixteen inches long and the paper was in the oven for thirty seconds. The oven air temperature was 180° C. and the paper was moved through in a single pass. Generally, the paper was dry to the touch just before exit from the infrared oven and was rewound after leaving the oven. The viscose used to coat the paper was a 1% cellulose content viscose which had been neutralized to a pH of 9 by a cation exchange as described in Example 4. A portion of the tissue paper was coated to a 4% cellulose addon and heat cured. The Scott wet strength of the impregnated or coated paper had increased to a value of 1263 g./in. Another portion of the paper was coated to a 0.5% cellulose addon and cured as described above. The paper had a Scott wet strength of 1120 g./in. Another portion of the paper was impregnated with viscose to a cellulose content of 0.6% and heat cured as described above. The Scott wet strength of the paper had increased to a value of 766 g./in.

In another experiment a chopped rayon-hemp (50:50) tissue paper was float coated as above described to a 0.5% cellulose content with a decausticized viscose having a pH of 7.4 (decausticized by cation exchange as in Example 5). The coated paper was dried in the infrared oven as described above and was found to have a Scott wet strength of 338 g./in. as compared to a wet strength of 36 g./in. for the untreated paper. A 15 lb. all-wood-pulp tissue containing 0.1% Triton X-100 wetting agent was float-coated with 0.5% cellulose content decausticized viscose (pH 7.4, produced by cation exchange) to produce a 3.3% cellulose addon. The paper was dried in the infrared oven and then tested for wet strength. The treated paper had a Scott wet strength of 884 g./in. as compared to 149 g./in. for the untreated paper.

In still another experiment a portion of the 15 lb. tissue containing Triton X-100 wetting agent was float-coated with a 1% decausticized amylose xanthate solution (pH 11.6 produced by cation exchange as described in Example 8). The coated paper was dried in the infrared oven as described above and then evaluated for wet strength. The paper containing regenerated amylose had a wet strength of 245 g./in. as compared to 148 g./in. for the untreated paper.

Several additional experiments were carried out in which various types of paper were coated or impregnated with decausticized viscose by a spray technique. The decausticized viscose was applied to the paper using a paint sprayer. In certain experiments the spray was applied to only one side of the paper, while in other experiments sprays were used for both sides of the paper. The paper was dried in an infrared oven as described in connection with the float-coating process. At cellulose addons of 1 to 2%, the wet strength of the paper ranged from about 500 to 1000 g./lin. in. (Scott test) as compared to 113 g./in. for the untreated paper.

When other decausticized viscose solutions are used to impregnate paper and the paper is dried and tested for wet strength, it is found to have increased manyfold in wet strength regardless of the process by which the viscose was decausticized. Thus, decausticized viscose prepared by dialysis or by anion or cation exchange or by ion retardation is effective as a wet strength additive for paper. There are some differences between the decausticized viscose solutions produced by the various processes described above, but the compositions are all effective wet strength additives. In general, the decausticized viscose prepared by cation exchange gives a slightly higher wet strength to paper than decausticized viscose prepared by the other processes. This appears to be due to the fact that the viscose treated with a cation exchange material is reduced to a substantially lower pH and can be regenerated more quickly either by acid treatment or by thermal treatment. The viscose solutions which are neutralized or decausticized by dialysis or by anion exchange or ion retardation have the advantage that objectionable odors and colored by-products are removed which are not always removed in the cation exchange treatment.

*Example 28*

A 0.5% cellulose content viscose was decausticized to a pH of 10.5 by treatment with cation exchange resin as described in Example 5 and dried as a 30 mil layer on a glass surface at 105° C. A clear, transparent coherent light yellow film was obtained which is useful as a packaging film. The film is also adherent to a variety of surfaces when initially formed and, thus, can be used as a coating material. Films were also prepared by thermal regeneration (at 130° C.) of 0.5% cellulose content viscose which had been decausticized by dialysis (to a pH of 11) and also which had been decausticized by anion exchange (to a pH of 11). These films had thicknesses of 0.3 to 0.6 mil rewet and had the Instron strengths of over 1 g./sq. mil rewet.

A 1% amylose xanthate solution was decausticized by treatment with a cation exchange resin as described in Example 8, to a pH of about 6.5. A portion of the decausticized amylose xanthate was formed into a film and regenerated by heating to a temperature of about 100° C.

Decausticized viscose and decausticized amylose xanthate (as well as other decausticized polysaccharide xanthates) can be formed into films usable for packaging and other similar applications by extrusion through a fine slit into a heated liquid or by casting as a film on a heated drum or heated belt from which the film is stripped after regeneration of the film-forming material is complete.

*Example 29*

Decausticized viscose prepared in accordance with any of the above techniques can be used as an adhesive for forming flat, cellulose impregnated paper into tubes suitable for further processing to form meat casings. A 2% cellulose content viscose which had been decausticized by dialysis was used to form an adhesive seam along one edge of a 14.5 lb. hemp tissue paper. Seaming was accomplished by spreading about three drops of the viscose per foot of 0.4-inch wide seam. The material was formed into a tube with a lap clamped in a vise and heated with an infrared lamp. The seams which were formed had a shear strength in excess of 10 lb./in. of seam length. The tubes which are thus produced are used as fibrous casings used in meat processing.

Viscose which was decausticized by ion exchange (both anion and cation exchange processes) was also evaluated as an adhesive for forming seams in paper tubing and was found to be quite effective.

*Example 30*

A cellulose-impregnated, high-wet-strength paper is prepared by impregnating a tissue paper with decausticized viscose (or amylose) as herein described and regenerating the same by acid or thermal treatment. The paper is continuously formed into tubes (in accordance with a commercially used procedure for forming fibrous casings) and impregnated with viscose to a very high cellulose content (paper represents only about 40% wt. of finished product). The impregnated tubing is passed into an acid regenerating bath which converts the viscose into regenerated cellulose. The product which is obtained is commercially referred to as fibrous casing and is a strong tubing of paper reinforced regenerated cellulose.

*Example 31*

In the manufacture of cellulose casings for various meat products, one of the principal problems is the smudging and offsetting of inks used to print legends on the casing. In several experiments a small amount of decausticized viscose was sprayed over the freshly printed surface of a cellulose casing and dried at 105° C. The coating was completely effective to prevent smudging and offsetting of the printed matter on the casing. It imparted gloss. A wetting agent may be used.

*Example 32*

Decausticized viscose prepared as described in the various processes above was used as a pigment binder in ink formulations for printing on regenerated cellulose. A black ink formulation was prepared by mixing 0.8 g. of carbon black with 400 ml. of 1% cellulose content decausticized viscose having a pH of 9.0 (produced by cation exchange). A few drops of this dispersion were then mulled with 0.4 g. of pigment and the resulting slurry added to the dispersion and mixed using a high speed laboratory mixer. A black ink was finally obtained containing 26% pigment. The ink was used to print on regenerated cellulose meat casings and was cured by heating for a short period at 115° C. The ink was found to have excellent properties (e.g. was non-toxic) and was strongly resistant to rubbing and scratching. If desired, lower pigment loadings may be used in making satisfactory ink compositions.

Example 33

A pH 9, 0.5% cellulose content, decausticized viscose (prepared by cation exchange) was used for dipping 3 oz. cotton muslin sheeting at 25° C. The cloth was allowed to drain vertically, and pieces were both air dried and force dried at 80° C. The sized pieces had a decidedly crisper feel than the controls. It is, therefore, apparent that decausticized viscose is an effective textile size.

Example 34

In Example 29 it was shown that decausticized viscose is an effective seaming agent for the paper preforms used in the formation of certain types of cellulose impregnated meat casings. Decausticized viscose and other decausticized film-forming polysaccharide xanthate solutions are generally effective as adhesives for cellulosic materials such as paper and wood. A comparison was made by using a small amount of decausticized viscose and raw viscose as an adhesive for paper followed by heat treatment of the adhesive joint. The seam or joint formed using decausticized viscose was substantially stronger in a dry state and was manyfold stronger when the seam was wetted. The decausticized viscose (and other decausticized polysaccharide xanthate solutions) is effective as an adhesive for laminating cellophane to produce a multilayer transparent, substantially colorless film. When the decausticized viscose was used as an adhesive for wood, the joint strength was high enough to delaminate the wood in shear.

Example 35

In another experiment decausticized viscose was used as a binder in preparing an ion exchange membrane. A 1% cellulose content pH 9, decausticized viscose was prepared by cation exchange and a 5% suspension of Dowex 1X8 Cl resin was made in it. A 14.5 lb., all wood pulp, tissue paper was dipped through the resin suspension and drained vertically. The resin used was the 100–200 mesh grade. The treated paper was then dried at 100° C. The decausticized viscose gave the paper a wet strength of 800 g./in. width. The bound resin showed excellent rub resistance. The paper with the ion exchange resin bound to it is effective as a membrane for use in dialysis, ion exchange analysis, chromatography, and for other purposes.

Example 36

In Example 28 the preparation of a polysaccharide film was described. The decausticized polysaccharide solution can be used in the casting of modified film or fiber by incorporation of a plasticizer such as glycerol or other additives such as dyes therein before regeneration of the polysaccharide.

Example 37

Decausticized viscose can be used as a host for polymer deposition. When the decausticized viscose is coated on a film or fiber, it is possible to deposit a guest polymer at the host surface. The decausticized viscose coating on the film or fiber is subjected to ion exchange with a salt of a catalyst which is part of a Redox catalyst system for initiating polymerization of a guest polymer. The film or fiber is then coated or impregnated with a solution of the monomer containing the other component of the Redox catalyst system with the result that polymerization takes place on the surface of the fiber or film at the points where the complementary portion of the catalyst has been deposited by ion exchange.

Example 38

In the preparation of viscose for formation of fibers or films, it is difficult to prepare a material having high D.P., high cellulose, and low alkali content because the high viscosity makes dissolving, deaeration, and filtration too difficult. When decausticized viscose of a concentration of 3 to 5% cellulose is added to an untreated viscose just before spinning, the resulting composition can have a much lower alkali content, a very high viscosity, and a substantially higher D.P.

Example 39

Decausticized viscose can be extruded as film or fiber into a solution of a complementary reactant to produce a new polymer in situ. Thus, the extrusion of decausticized viscose into a solution of an isocyanate or an isocyanate-ended polyether produces a composite film or fiber.

In one experiment a mixture of 100 g. carbon tetrachloride, 5 ml. phenyl isocyanate, and 8 drops of Triton X–100 was prepared. The mixture was poured slowly into 200 ml. of pH 8, 0.5% cellulose content viscose in a blender. The pH of the emulsion was adjusted to 4.5 using acetic acid. The contents were poured into a beaker and allowed to stand at 25° C. for 72 hours. A white gel was recovered from the surface of the aqueous layer which was a cellulose derivative.

In another experiment adipoyl chloride, as a 1% solution in carbon tetrachloride, was added similarly to 200 ml. of pH 8, 0.5% cellulose content viscose. No additional acid was used. After 10 min. reaction time the pH was adjusted from 1.4 up to 4.0. A cross-linked cellulose derivative was recovered.

Example 40

Decausticized viscose can be mixed with other polymeric materials and low molecular materials to make composite articles. Thus, the low electrolyte content permits the mixing of the viscose without coagulation. Dyes, carboxymethyl cellulose, amylose, polyvinyl alcohol, polyacrylic acid, and the like can be kept in a finer state of dispersion in decausticized viscose than is possible in untreated viscose. The regeneration of the dispersion is effective to produce novel composite articles.

Example 41

When decausticized viscose is subjected to cyanoethylation or carbamoethylation, a product is obtained which is compatible with polyesters for use as a water-regain or static reducing additive on polyester fibers.

Example 42

Decausticized viscose can be used to coat a thermoplastic film to make the same adherent to regenerated cellulose to provide for heat sealing of the cellulose film to another object.

Example 43

When decausticized viscose and hexamyethylene diamine are mixed in carbontetrachloride and contacted with a carbontetrachloride solution of adipoyl chloride, a mixture of nylon and graft polymers of nylon and cellulose are formed in dispersion. Fibers which are formed of this composition are more hydroscopic and have a wider dyeing range.

Example 44

Decausticized viscose can be used in aqueous solution as an interfacial reactant to form a cellulose ether or ester or a urethane from a complementary reactant in an inert immiscible solvent such as diisocyanate diphenylmethane in toluene.

Example 45

Decausticized viscose as a concentrated dope can be cast and then acid regenerated to cellulose film or fiber. From the material which is produced, it is possible to obtain basic information on the effects of salt coagulation on gel structure apart from acid regeneration effects. No

Example 46

Decausticized viscose is used as incapsulating resin for packaging drugs, inks, dyes, etc., in microcapsules. The decausticized viscose is used in the formation of such microcapsules by the same techniques used in the prior art for the formation of such microcapsules from gelatin.

Example 47

Decausticized viscose was applied to bast fiber in its acid form to produce a coated fiber in which cellulose addons in the range from about 0.5 to 4.5% were obtained. In one experiment a bast fiber paper in the acid form was coat-coated with untreated viscose, and decausticized viscose was formed in-situ by reaction with the acid ion exchange sites on the paper. This coating technique was effective to provide a 1–2% cellulose addon within and around the fibers of the paper. The cellulose can be regenerated by simple storage of the coated fiber at moderately elevated temperatures or by drying at temperatures of the order of 100° C.

Example 48

Decausticized viscose is mixed with paper pulp in the formation of paper to promote the exhaustion of basic resins onto the paper. The decausticized viscose can also be used as a beater additive in a paper machine. The viscose upon regeneration to a cellulose acts as a binder for the resin and paper.

Example 49

Decausticized viscose can be made from a crude viscose which has not been given the conventional deaeration or filtration treatments. Such a crude viscose is much cheaper than a film or fiber grade viscose, but after decausticization by dialysis or by an exchange, it is effective for use as a wet strength size or coating for paper.

Example 50

Decausticized viscose reacted wtih a halogenated acid, such as chloroacetic acid, is coated on a substrate as an ultraviolet barrier.

Example 51

Decausticized viscose containing a small amount of alkali is applied to a saponifiable film substrate, such as cellulose acetate or polyethylene terephthalate, to improve printability of the film.

Example 52

Decausticized viscose is used as a patching material for repairing holes in regenerated cellulose casings.

Example 53

Decausticized viscose is used to coat nylon fibers to produce a composite fiber having a regenerated cellulose coating. The resulting product gives better dispersion of fibers in viscose and good matrix fiber adhesion.

Example 54

Decausticized viscose is used to coat synthetic fibers, such as nylon or dacron, to be incorporated in the formation of synthetic papers. It is also used as a binder for such papers.

Example 55

Decausticized viscose was used as an intermediate in the formation of other salts of cellulose xanthate by cation exchange. Thus, when decausticized viscose was passed through the cation exchange resin in the ammonium form, a solution of ammonium cellulose xanthate at pH 9.5 was obtained. Similarly, if a solution of decausticized viscose is passed through a cation exchange resin in the lithium or potassium form, the corresponding lithium or potassium cellulose xanthates are obtained.

When viscose which had been purified using Dowex 1 OH resin was passed as an ice cold 1% cellulose content solution through cooled Amberlite IRC 50 H resin, an effluent of pH 5 was obtained. This effluent was frozen (to prevent decomposition) and consisted of cellulose xanthic acid.

Example 56

Decausticized viscose can be used in the preparation of cellulosic thiourethanes by the zinc-amine method described in Patent 2,705,231.

Example 57

Decausticized viscose having a pH of about 7 is used to coat alkali sensitive substrates such as nylon, wool, silk, low D.S. (degree of substitution) cellulose ethers and esters, that cannot otherwise be coated with viscose without damage.

Example 58

Decausticized viscose is used in making cellulose ethers and esters with a uniformity of substitution that is not easily obtained in heterogeneous esterification or etherification reactions. Decausticized viscose is reacted with chloroacetic acid in aqueous solution to produce a cellulose ether or with adipoyl chloride to produce a cellulose ester.

Example 59

Decausticized viscose is mixed with textile fibers and used as a binder in the formation of non-woven textiles. Thus, bars of glass, Mylar, nylon, and cellulose acetate fibers can be impregnated and pressed or cured to form a fabric.

Example 60

Decausticized viscose is used as a coating for glass during shipment or as a carrier of a tint for store windows. The coating serves to keep the glass clean and in thicker layers is protective.

Example 61

Decausticized viscose is mixed with soil as a temporary soil binder. As a binder it can be used for preparation of concrete forms or as an adjunct to other binders used for such purposes.

From the many examples given above, it is seen that decausticized viscose is useful for a large variety of purposes for which untreated viscose cannot be used. The many applications of decausticized viscose are equally applicable as uses for decausticized amylose xanthate solutions and other decausticized polysaccharide xanthate solutions as described above. Decausticized viscose can also be used as a thickener in dye solutions, pigment dispersions, and other dispersions or solutions where the chemical instability of the xanthate is not important. Decausticized viscose is useful as an ore floatation agent and as a reactant in recovering metals that form insoluble sulfides. Decausticized viscose can be mixed with cheaper wet strength resins to make an intermediate strength resin mixture.

While this invention has been described with reference to several specific embodiments, it should be understood that within the scope of the appended claims this invention can be practiced otherwise than as specifically described.

What is claimed is:

1. A method of preparing a decausticized solution of a film-forming material which comprises contacting a caustic aqueous solution of an alkali xanthate of a film-forming polysaccharide with an insoluble material selected from the group consisting of cation exchange materials in the hydrogen ion form, anion exchange materials in the salt form, and ion retardation materials in a sufficient amount and for a sufficient time to reduce the pH of the solution to less than about 13.

2. A method in accordance with claim 1 in which the solution treated is viscose.

3. A method in accordance with claim 1 in which the solution treated is amylose xanthate.

4. A method of preparing a decausticized viscose substantially free of alkali cellulose and free cellulose which comprises contacting an aqueous viscose solution with sufficient cation exchange resin in the hydrogen ion form to neutralize a substantial proportion of the alkali content of the viscose and reduce the pH thereof to a value in the range from about 4 to 13.

5. A method in accordance with claim 4 in which a predetermined amount of resin is mixed with the viscose at ambient temperature until reaction is complete and the resin is separated from the mixture.

6. A method in accordance with claim 4 in which the viscose is passed through a column containing the resin.

7. A method of preparing a decausticized viscose substantially free of alkali cellulose and free cellulose which comprises passing an aqueous viscose solution through a column containing an anion exchange resin in the salt form and recovering an effluent comprising decausticized viscose having a pH less than 13.

8. A method of preparing a decausticized viscose substantially free of alkali cellulose and free cellulose which comprises passing an aqueous viscose solution through a column containing an ion-retarding resin and recovering an effluent comprising decausticized viscose having a pH less than 13.

9. A method of preparing a decausticized viscose substantially free of alkali cellulose and free cellulose which comprises subjecting an aqueous viscose solution to dialysis to remove a substantial proportion of soluble impurities therefrom, and subjecting the dialyzed viscose solution to ion exchange treatment to produce an aqueous viscose residue having a pH less than 13.

10. A method of preparing a decausticized amylose xanthate substantially free of alkali amylose and free amylose which comprises contacting an aqueous amylose xanthate solution with sufficient cation exchange resin in the hydrogen ion form to neutralize a substantial proportion of the alkali content of the amylose xanthate and reduce the pH thereof to a value in the range from about 4 to 13.

11. A method of preparing a decausticized amylose xanthate substantially free of alkali amylose and free amylose which comprises passing an aqueous amylose xanthate solution through a column containing an anion exchange resin in the salt form and recovering an effluent comprising decausticized amylose xanthate having a pH in the range from about 4 to 13.

12. A decausticized aqueous solution of a film-forming polysaccharide xanthate having a pH of about 4 to 8 and substantially free of regenerated polysaccharide.

13. Decausticized viscose having a pH of about 4 to 8 substantially free of regenerated cellulose and containing xanthic acid groups in excess of 40% of the xanthate content of the viscose.

14. Decausticized aqueous amylose xanthate having a pH of about 4 to 8 substantially free of regenerated amylose and containing xanthic acid groups in excess of 40% of the xanthate content thereof.

15. A thermally regenerated amylose film produced by thermal regeneration of a decausticized amylose xanthate solution produced in accordance with claim 1.

16. A film produced by thermal regeneration of decausticized viscose substantially free of by-product salts and produced in accordance with claim 1.

References Cited by the Examiner

UNITED STATES PATENTS

| | | | |
|---|---|---|---|
| Re. 22,489 | 5/1944 | Schlosser et al. | 260—217 |
| Re. 23,013 | 6/1948 | Schlosser et al. | 260—217 |
| 1,852,466 | 4/1932 | McConnell | 260—218 |
| 1,955,092 | 4/1934 | Richter | 260—217 |
| 1,974,755 | 9/1934 | Schur | 260—218 |
| 2,011,156 | 8/1935 | Nelson et al. | 117—157 |
| 2,045,349 | 6/1936 | Goodman | 117—86 |
| 2,045,410 | 6/1936 | Richter et al. | 117—86 |
| 2,422,573 | 6/1947 | Lilienfeld | 117—166 |
| 2,502,782 | 4/1950 | Erickson | 117—157 |
| 2,528,099 | 10/1950 | Wilcox et al. | 210—263 |
| 2,572,848 | 10/1951 | Fitch | 210—263 |
| 2,805,196 | 9/1957 | Roebersen et al. | 204—151 |
| 2,825,655 | 3/1958 | Meadows | 260—216 |
| 2,910,380 | 10/1959 | Shiner | 117—157 |
| 3,135,613 | 6/1964 | Underwood | 117—157 |

FOREIGN PATENTS 867,450    5/1961    Great Britain.

OTHER REFERENCES

Myers et al.: "Synthetic Resins as Exchange Absorbents," Ind. and Eng. Chem., Vol. 33, No. 6, June 1941, pp. 697–706, 210–24.

Kressman: "Ion Exchange Materials and Their Applications in Industry," Chemistry and Industry, January 21, 1956, pp. 64–69, 210–24 (Chemical Abstracts 26–5760$^9$, 1932).

LEON BERCOVITZ, *Primary Examiner.*

WILLIAM D. MARTIN, *Examiner.*

R. W. MULCAHY, *Assistant Examiner.*